Feb. 2, 1932.    S. HINDS    1,843,674
DISPENSING DEVICE
Filed Sept. 13, 1929    2 Sheets-Sheet 2
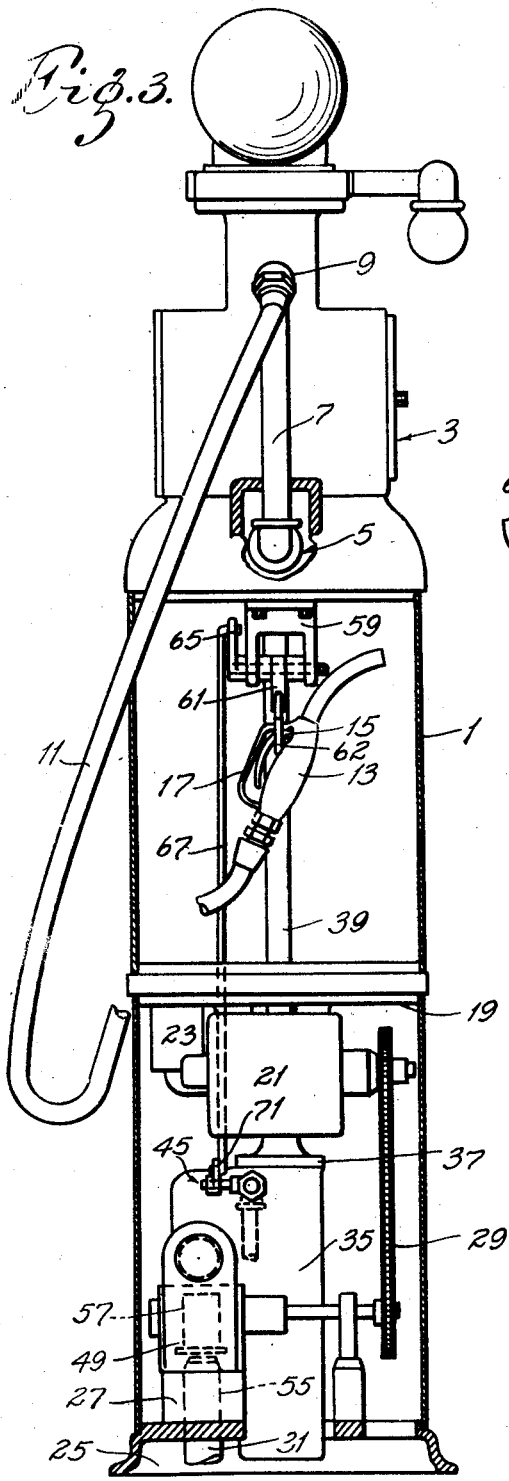
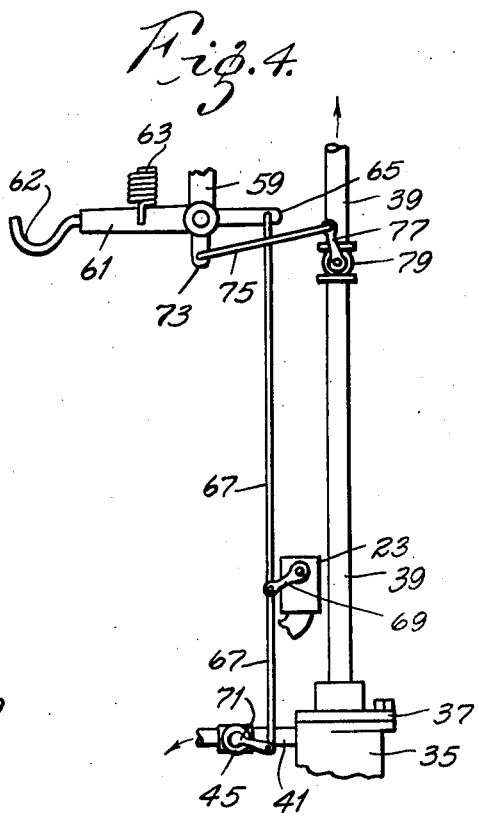

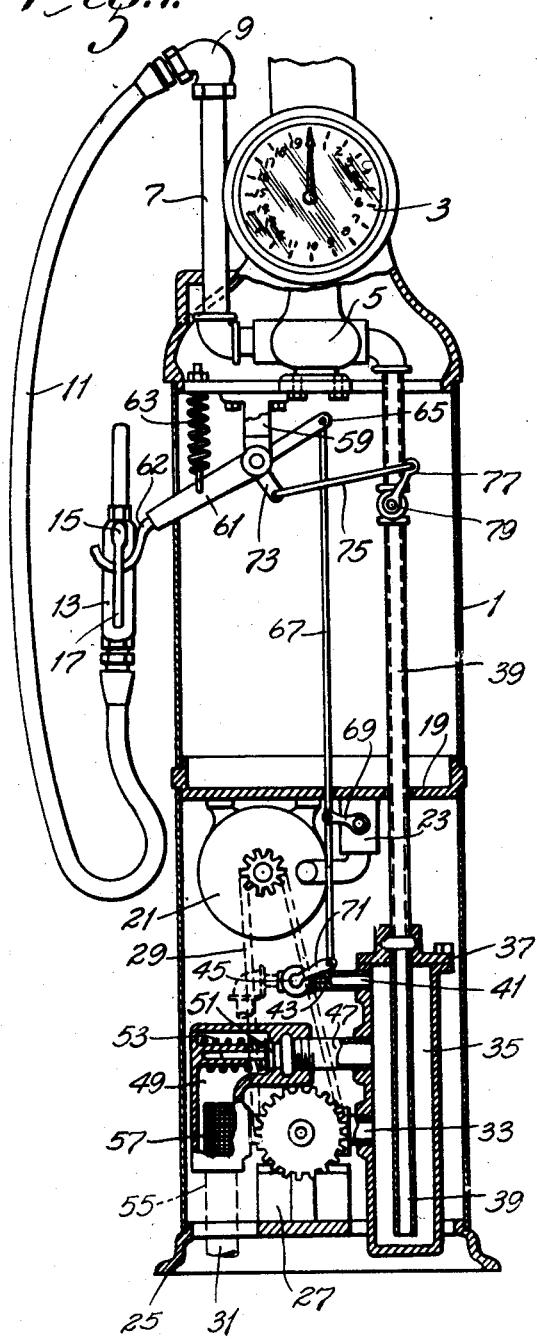

Patented Feb. 2, 1932

1,843,674

UNITED STATES PATENT OFFICE

SHERWOOD HINDS, OF ST. LOUIS, MISSOURI

DISPENSING DEVICE

Application filed September 13, 1929. Serial No. 392,309.

This invention relates to dispensing devices, and with regard to certain more specific features, to gasolene dispensing devices of the metered flow type.

Among the objects of the invention may be noted the provision of a gasolene dispensing device or filling station of the metered flow type, wherein air bubbles and the like are minimized, a device of the class described which is characterized by its simplicity while performing with many added advantages, a device which is instantaneous in response to operation of a dispensing valve, a device which pumps gasolene free of vapors and air bubbles, thereby reducing the probability of erroneous measurement, and a device of the class described which is simple and economical to manufacture, and which is rugged and durable in operation. Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawings, in which is illustrated one of various possible embodiments of the invention, Fig. 1 is a sectional view of the device;

Fig. 2 is a sectional view of the device of Fig. 1, taken at right angles to the section of Fig. 1;

Fig. 3 is a sectional view similar to Fig. 2, but taken in the reverse direction; and, Fig. 4 is a fragmentary view showing the device in delivery position.

Similar reference characters indicate corresponding parts throughout the several views of the drawings.

Referring now more particularly to Fig. 1, there will be seen at numeral 1 a housing of conventional design which is adapted to enclose and support the mechanism of the dispenser. At numeral 3 is indicated the graduated face of a liquid meter 5, which is adapted to indicate the quantity of liquid being delivered. The meter 5 may be of any well-known construction, that is, adapted to this purpose and requires no description herein.

Leading from the meter 5, through the housing 1, is a delivery pipe 7. To the delivery pipe 7 is connected through a suitable coupling 9 a delivery hose 11. The end of the delivery hose 11 is provided with a dispensing nozzle 13, of usual design. The nozzle 13 may be equipped with a valve 15, operated by a lever 17, for ready control of the flow at the end of the hose 11. It is to be understood, however, that the valve 15 is not essential to the proper operation of the filling station.

The lower portion of the housing 1 is separated from the upper portion by a support plate 19. On the under side of the plate 19 is mounted a motor 21, for pump driving purposes, and an electric switch 23, to be described hereinafter.

The housing 1 is also supplied with a base plate 25, upon which is mounted a pump 27. The pump 27 is driven by the motor 21 preferably through a chain drive 29. An inlet pipe 31 connects the pump 27 with a gasolene supply tank or the like (not shown). An outlet pipe 33 of the pump 27 leads to a trap 35. The shape of the trap 35 will be seen in Figs. 2 and 3, where it will be seen that it comprises a hollow box with an open top. In operation, the top is closed by a plate 37. Passing through the plate 37, and nearly to the bottom of the trap 35, is an outlet pipe 39, which communicates with the meter 5 as will be pointed out hereinafter.

Leading from the trap 35, near the top thereof, is an air vent pipe 41. The pipe 41 has therein a constricted portion 43, to prevent the passage of liquids while permitting the passage of air, vapors and the like. The pipe 41 also has therein a valve 45, adapted to close and open the air vent under conditions that will be described hereinafter.

Also leading from the trap 35 is an overflow pipe 47, which communicates with a chamber 49. At the entrance of chamber 49 is provided a valve 51, actuated by a spring 53, which normally functions to close the overflow pipe 47. It will be seen that the building up of a pressure in the trap 35 will cause the valve 51 to open, allowing the overflow pipe 47 to communicate with the chamber 49. Leading from the bottom of the chamber 49 is an outlet pipe 55 which leads to the inlet pipe 31, permitting the overflow liquid to return to the pump to be recirculated through the system. A strainer 57 may be provided in the chamber 49 at the outlet 55 thereof, as shown in Fig. 1.

It is to be understood that the outlet pipe 55 may be carried directly to the gasolene storage tank, instead of returning to the pump 27.

In the top portion of the housing 1 is supported a bracket 59, which in turn supports a lever 61. The lever 61 projects without the housing 1, and has its outward end curved as at 62 to receive the nozzle 13. A spring 63 is adapted to hold the lever 61 in operating position (to be described) when the nozzle 13 is not suspended thereon, and is adapted to release the lever 61, to closed position when the weight of the nozzle 13 is applied to hook 62. It is to be understood that any suitable support may be provided for the nozzle 13, and that the lever 61 may be manipulated entirely by hand.

The backward extension 65 of the lever 61 has movably connected thereto an operating rod or link 67. The rod 67 is connected through lever 69 to the electric switch 23, and through another linkage 71 to the air vent valve 45.

Extending from the lever 61, at substantially right angles thereto and integrally formed therewith, is a lever 73. Connected to this lever 73 is a rod 75, which is attached at its other end to the handle 77 of a valve 79 in the outlet pipe 39, passing between the trap 35 to the flow meter 5.

The above described levers are so arranged that when the device is in closed position (when the nozzle 13 is resting on the hook 62, as in Fig. 1), the valves 45 and 79 are closed, and the electric switch 23 is in "off" position. When the nozzle 13 is removed from the hook 62, (see Fig. 4), the spring 63 causes the lever 61 to alter its position, and thereby operating rods 67 and 75 to open valves 45 and 79, and turn the electric switch 23 "on".

The operation of the dispenser is as follows:

When it is desired to deliver gasolene, the nozzle 13 is removed from the hook 62 and placed in the gasolene tank of the automobile in the usual fashion. As described above, the removal of the nozzle 13 throws the electric switch 23 "on". This immediately sets the pump 27 in action. The pump 27 pumps gasolene from the supply tank and delivers it into the trap 35.

The purpose of the trap 35 is to permit the gasolene to settle, thereby becoming freed of air bubbles and the like, which rise to the top of the trap 35 and pass out through the air vent 41. Upon opening the valve 15 in the nozzle 13, gasolene flows from the bottom of the trap 35 into the outlet line 39, through the meter 5 and into the nozzle 13 for delivery. It will thus be seen that the trap 35 acts as a sump, with the liquid passing out from the bottom and the vapors from the top.

The constricted portion 43 of the air vent 41 prevents the passage through that way of any considerable amount of gasolene.

When the valve 15 in the nozzle 13 is closed (after the proper amount of gasolene has been metered), there is generally a time lag before the nozzle 13 is hung upon the hook 62, and, in the meanwhile, the pump 27 continues to pump gasolene into the trap 35, thereby setting up a pressure. The pressure causes the relief valve 51 in the overflow pipe 47 to open at a predetermined pressure and the surplus gasolene passes out of the trap 35 to be returned to the storage tank or recirculated through the pump, thus limiting the excess pressure.

When the nozzle 13 is hung on the hook 62, the valves 45 and 79 close and the electric switch 23 assumes an "off" position and at the same time the pressure in the trap 35 is lowered due to the stoppage of the pump and the valve 51 recloses.

It is to be noted that the structure is not limited to the foregoing description; for example, two or more flow meters may be used with the same trap, or a double-faced flow meter dial may be used. The control means may also be independent of the delivery nozzle, in which case the delivery nozzle is hung upon a stationary hook provided for the same, while the hook 62 becomes a manually operable lever.

Other variations comprise elimination of the valve 79, which is now generally used but which is not essential. Also, the valve 71 may be remotely controlled electrically, pneumatically or otherwise when the nozzle 13 is lifted, and this would be desirable where a single pump (including a single trap and valve 71) serves several meters and hoses. In such case each nozzle could be made to close a paralleled portion of a circuit when the respective nozzle (or nozzles) is lifted and a solenoid in said circuit and associated with said valve could thus be energized to open said valve 71.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In a dispensing device, a meter, a line adapted to supply liquid to the meter, a valve in said line, a chamber, a vent pipe from said chamber, a valve in the vent pipe, operating means connecting said two valves whereby they are simultaneously opened, said line to the meter having an inlet in the chamber at a point below said vent, electrically driven means for supplying liquid to the chamber, a switch for starting said means and means for connecting said switch with said valves whereby the switch is closed when the valves are open.

2. In a motor fuel filling station, a meter, outlet means from the meter, an inlet therefor, a valve in the inlet line, a chamber associated with the inlet pipe, a vent from the chamber, a valve in the vent, said pipe to the flow meter leading to a point in the chamber below the vent, motor driven means for supplying liquid to the chamber, a switch adapted to close to start said last named means, interconnected means joining said valves, a switch adapted to open the valves when the switch is closed and vice versa, said interconnected means being adapted to support the weight of the outlet from the meter and when said weight is so supported to open the switch.

3. In a motor fuel filling station, a meter, outlet means from the meter, an inlet therefor, a valve in the inlet line, a chamber associated with the inlet pipe, a vent from the chamber, a valve in the vent, said pipe to the flow meter leading to a point in the chamber below the vent, motor driven means for supplying liquid to the chamber, a switch adapted to close to start said last named means, interconnected means joining said valves and switch adapted to open the valves when the switch is closed and vice versa, said interconnected means having means adapted to support the weight of the outlet from the meter and when said weight is so supported to open the switch, and a by-pass from the outlet to the supply means of the liquid pumping means.

4. In a motor fuel filling station, a meter, outlet means from the meter, an inlet therefor, a valve in the inlet line, a chamber associated with the inlet pipe, a vent from the chamber, a valve in the vent, said pipe to the meter leading to a point in the chamber below the vent, motor driven means for supplying liquid to the chamber, a switch adapted to close to start said last named means, interconnecting means joining said valves and the switch adapted to open the valves when the switch is closed and vice versa, and a by-pass from the outlet of the pumping means to the inlet thereof.

5. In a motor fuel filling station, a meter, outlet means from the meter, an inlet line therefor, a chamber associated with the inlet line, a vent from the chamber, a valve in the vent, said pipe to the meter leading to a point in the chamber below the vent, motor driven means for supplying liquid to the chamber, a switch to close to start said last named means, interconnecting means between the switch and the valve whereby the latter is opened when the former is closed and said interconnected means being adapted to support the weight of the outlet from the meter and when said weight is so supported to open the switch.

6. In a motor fuel filling station, a meter, outlet means from the meter, an inlet line therefor, a chamber associated with the inlet line, a vent from the chamber, a valve in the vent, said pipe to the meter leading to a point in the chamber below the vent, motor driven means for supplying liquid to the chamber, a switch to close to start said last named means, interconnecting means between the switch and the valve whereby the latter is opened when the former is closed and said interconnected means being adapted to support the weight of the outlet from the meter when said weight is so supported to open the switch and a by-pass from the outlet to the supply means of the liquid pumping means.

7. In a dispensing device, a meter, a line adapted to supply liquid to the meter, a valve in said line, a chamber, a vent pipe from the chamber, a valve in the vent pipe, said line to the meter having an inlet in the chamber below said vent, means for supplying liquid to the chamber, starting means for said supplying means and means for simultaneously actuating said starting means and said valves to effect starting when the valves are opened.

8. In a motor fuel filling station, a meter, outlet means from the meter, an inlet line therefor, a chamber associated with the inlet line, a vent from the chamber, a valve in the vent, said line to the meter leading to a point in the chamber below the vent, motor driven means for supplying liquid to the chamber, a switch adapted to close to start said last named means, means associated between the switch and the valve whereby the valve is opened when the switch is closed, said valve remaining open until said switch is again opened.

In testimony whereof, I have signed my name to this specification this 7th day of September, 1929.

SHERWOOD HINDS.